UNITED STATES PATENT OFFICE.

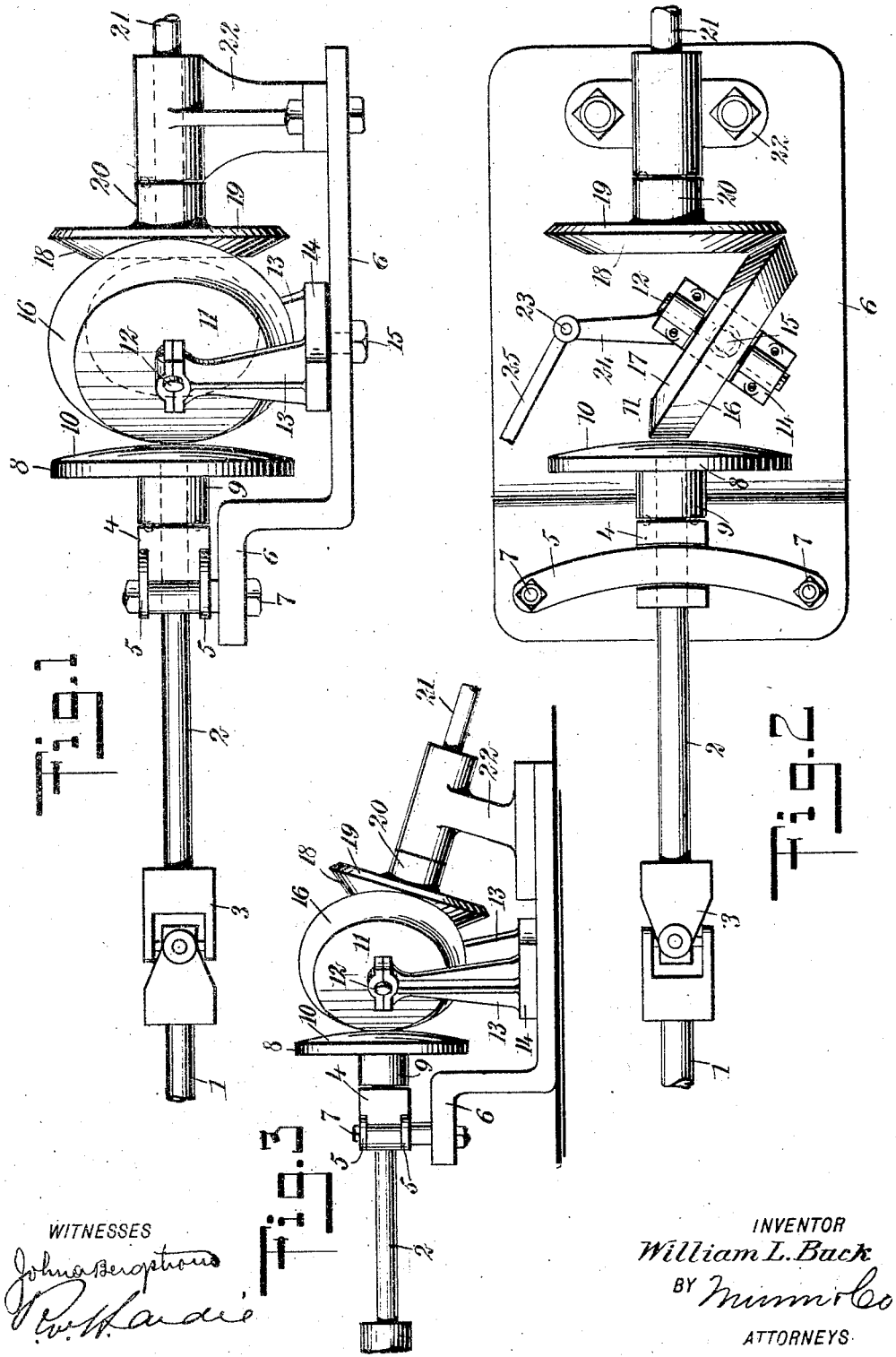

WILLIAM L. BUCK, OF NEW YORK, N. Y.

POWER-TRANSMISSION MECHANISM.

No. 874,828.   Specification of Letters Patent.   Patented Dec. 24, 1907.

Application filed March 30, 1907. Serial No. 365,473.

*To all whom it may concern:*

Be it known that I, WILLIAM L. BUCK, a citizen of the United States, and a resident of the city of New York, borough of Brooklyn, in the county of Kings and State of New York, have invented a new and Improved Power - Transmission Mechanism, of which the following is a full, clear, and exact description.

This invention relates primarily to means for varying the speed of a rotating shaft, and while adapted to be used in various connections it is especially designed for use with automobile and marine power transmission mechanism.

The invention consists in the special construction and arrangement of the mechanism illustrated in the accompanying drawings, in which drawings like characters of reference indicate like parts throughout the views, and in which.

Figure 1 is a side elevation of a device embodying my invention; Fig. 2 is a plan view of the same; and Fig. 3 is a side elevation of a device showing a modified arrangement of the parts.

As illustrated in the drawings, 1 represents a drive shaft connected with an auxiliary shaft 2 by means of a flexible joint 3. The free end of the shaft 2 is journaled in a bearing box 4 which is mounted to slide upon guide-ways 5 attached at their ends to a bed plate 6 by means of bolts 7. The free end of the shaft 2 is provided with a friction wheel 8 having a convex face 10 and a hub 9 fixedly attached to said shaft. An auxiliary wheel 11 is fixed to a shaft 12 which is journaled in standards 13 of a frame or yoke 14 pivotally mounted upon the bed plate 6 by means of a pivot pin 15. The auxiliary wheel 11 is provided with a double beveled face, one side 16 of which is adapted to bear against the convex face of the wheel 8, the opposite bevel 17 bearing against the beveled face 18 of a friction wheel 19, preferably provided with a hub 20 which is fixedly attached to a shaft 21 journaled in a pedestal 22 which is also mounted upon the bed plate 6. An arm 24 is fixedly connected to the yoke 14 and pivotally attached by means of a pin 23 with a link or rod 25, which may be connected in any suitable manner with operating or adjusting mechanism so as to partially rotate the yoke 14 on its pivot and cause the faces of the intermediate wheel to bear firmly against the faces of the driving and driven wheels.

In the construction shown in Figs. 1 and 2, the driven shaft 21 is arranged horizontally. Such arrangement of the parts may be modified, however, and the shaft inclined as shown in Fig. 3. Mechanism of any suitable construction may be connected with the pivoted shaft 2 to move said shaft laterally in its bearings and lock the shaft in any desired position on said guide ways.

When the device is in operation and the parts arranged as shown in Fig. 2, the shaft 2 transmits no motion to the auxiliary or friction wheel 11 and oppositely disposed friction wheel 19, for the reason that the beveled face 16 of the auxiliary wheel is arranged opposite the center of the face of the friction wheel 8. When, however, the wheel 8 is moved laterally with the free end of the shaft, the rotary movement of the wheel 8 is imparted by frictional contact to the auxiliary wheel 11, which in turn transmits said motion to the oppositely disposed friction wheel 19 and the driven shaft 21 upon which said wheel is mounted. The direction of rotation of the auxiliary friction wheel 11 and shaft 21 is varied or determined by the side of the friction wheel 8 which bears against the beveled face 16 of the auxiliary wheel 11. One side of said friction wheel rotates the auxiliary wheel 11 in one direction, and the opposite side of said wheel rotates said wheel in the opposite direction, the driven shaft 21 following the direction of rotation of the intermediate friction wheel. The speed of the driven shaft is obviously varied by the relative position of the face 16 of the intermediate friction wheel on the face of the drive wheel 8, the speed of the auxiliary or intermediate wheel being increased as the outer portion of the drive wheel is brought in contact with the friction surface of the intermediate wheel. Conversely, the speed of the intermediate wheel is decreased as the central portion of the drive wheel is brought to bear against the opposite face of the intermediate wheel. The beveled faces of the intermediate wheel are held firmly against the faces of the driving and driven wheel by means of the bell crank-lever which rotates the yoke 14 on its pivotal supports, and enables all lost motion and wear to be taken up between the faces of the intermediate wheel and the driving and driven wheels.

Having thus described my invention, what I claim as new and desire to secure by Letters Patent is:

1. In a power transmission mechanism, the combination of a pivoted shaft, a drive wheel mounted thereon and provided with a convex surface, a driven wheel having a beveled face, and an intermediate wheel provided with a double bevel arranged between said wheels.

2. In a power transmission mechanism, the combination with a pivoted shaft, of a drive wheel mounted on said shaft and provided with a convex face, a driven shaft, a wheel mounted on said driven shaft and provided with a beveled face, a pivoted frame intermediate said wheels, and a wheel provided with a double bevel journaled in said frame.

3. In a power transmission mechanism, the combination with a pivoted shaft, of a bearing box for said shaft, curved guide ways adapted to seat said box, a drive wheel mounted on the free end of said shaft and provided with a convex face, a driven shaft, an oppositely disposed driven wheel mounted on said shaft and provided with a beveled face, and an intermediate friction wheel provided with a double bevel engaging the faces of said wheels.

4. In a power transmission mechanism, the combination with a pivoted shaft, of arc guide ways, a bearing box adapted to receive said shaft and slide in said guide ways, a driven wheel mounted on the free end of said shaft and provided with a convex face, a driven shaft, an oppositely disposed driven wheel mounted on said shaft and provided with a beveled face, a yoke intermediate said wheels, and a wheel provided with a double bevel journaled on said yoke.

5. In a power transmission mechanism, the combination with a pivoted shaft, of curved guide ways, a bearing box for said shaft adapted to slide on said guide ways, a drive wheel mounted on the free end of said shaft and provided with a convex face, a driven shaft, a wheel mounted on said driven shaft and provided with a beveled face, a pivotally mounted yoke, an intermediate friction wheel provided with a double bevel and journaled on said yoke, and means for rotating said yoke on its pivotal support.

6. In a power transmission mechanism, the combination of a drive shaft having a laterally movable free end, a drive wheel mounted on said shaft and provided with a convex face, a driven shaft, an oppositely disposed driven wheel mounted on said shaft and provided with a beveled face, a vertically pivoted yoke, and an intermediate friction wheel mounted on said yoke and provided with oppositely disposed bevels bearing against the drive wheel and driven wheel respectively.

In testimony whereof I have signed my name to this specification in the presence of two subscribing witnesses.

WILLIAM L. BUCK.

Witnesses:
ROBERT W. WARDIE,
JOHN P. DAVIS.